(No Model.)

I. DAVIS.
PLOW FENDER.

No. 328,924. Patented Oct. 27, 1885.

WITNESSES
M. E. Fowler
Edw. G. Siggers

Isaac Davis.
INVENTOR
by C. A. Snow & Co.
Attorneys

UNITED STATES PATENT OFFICE.

ISAAC DAVIS, OF PERIN'S MILLS, OHIO.

PLOW-FENDER.

SPECIFICATION forming part of Letters Patent No. 328,924, dated October 27, 1885.

Application filed January 20, 1885. Serial No. 153,438. (No model.)

*To all whom it may concern:*

Be it known that I, ISAAC DAVIS, a citizen of the United States, residing at Perin's Mills, in the county of Clermont and State of Ohio, have invented a new and useful Improvement in Tobacco-Plow Fenders, of which the following is a specification, reference being had to the accompanying drawings.

This invention relates to plow-fenders, and more particularly to that class of devices which are attached to plows employed in the cultivation of tobacco-plants, for the purpose of raising the leaves of the plants from off the ground and holding them elevated while the plow is throwing over or turning the dirt in against the stalks; and it has for its object to provide a simple, durable, and efficient device which may be attached with ease to any plow or cultivator in use, and by means of which the lower leaves of the plants will be raised out of the way of the falling clods of earth, and thus prevented from being broken off or otherwise injured.

With these ends in view the said invention consists in certain details of construction and combination of parts, as hereinafter set forth, and particularly pointed out in the claims.

Figure 1:
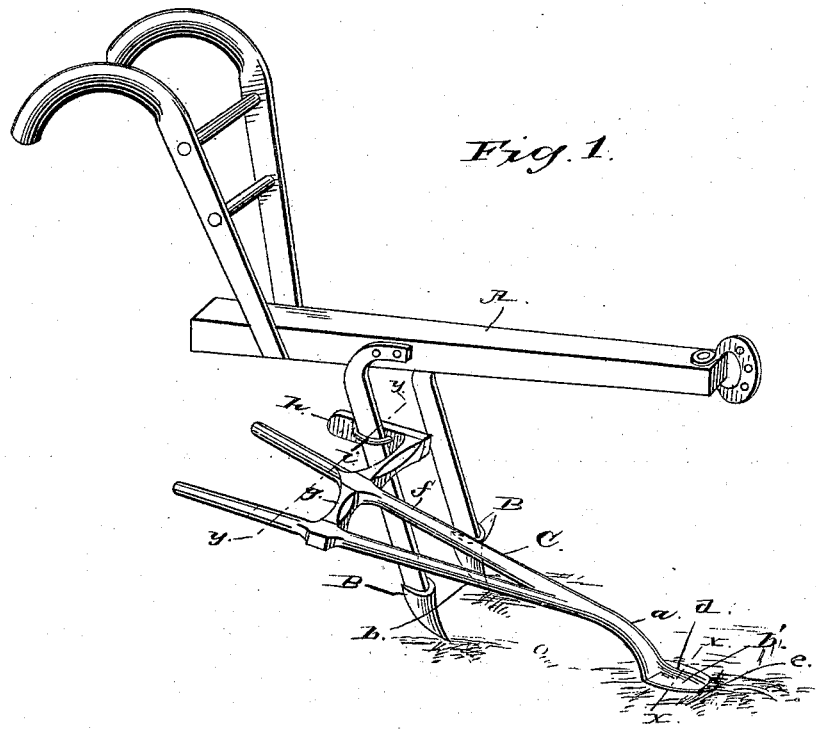
Figure 2:
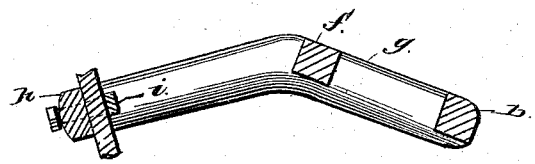
Figure 3:
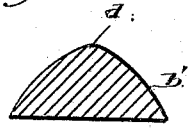

In the accompanying drawings, Figure 1 is a perspective view of a plow with my improved fender attached thereto and in position for operation. Fig. 2 is a transverse section on the line $y\, y$, Fig. 1. Fig. 3 is a transverse section on the line $x\, x$, Fig. 1, through the foot or point of the fender.

Like letters are used to designate corresponding parts in the several figures.

Referring to the drawings, A designates a plow or cultivator of the usual construction, having the shovels B B arranged on opposite sides of the beam, and one slightly in rear of the other, to work in different paths for cultivating the rows of plants.

C designates the fender, comprising the main longitudinal arm $b$, which is curved downward near its forward end at $a$, and provided with a shoe, $b'$, having its under face formed flat, and its upper face provided with a central ridge, $d$, the body of the shoe curving downward on both sides of said ridge, beginning gradually at the rounded point $e$. (See Fig. 3.) From the point $a$ on the main arm $b$ diverges an inclined arm, $f$, which extends back on a line with the end of the main arm, but arranged on a higher horizontal plane.

$g$ designates a transverse brace-bar having one end attached to the main arm $b$, curving upward to connect with the inclined arm $f$, and then downward, and having its other end provided with a short straight arm, $h$, arranged on the same horizontal plane as the main arm $b$. A clevis, $i$, is attached to the inner face of the short arm $h$, and has its threaded ends passing through the same and provided with nuts for securing the fender at any point on the plow stock or standard.

The operation of my invention will be readily understood from the foregoing description, taken in connection with the annexed drawings. The short arm $h$ is attached to the rear shovel or plow of the cultivator by the clevis $i$, and the fender proper extends forward, its rounded point running slightly in the ground, so that the bend or curve $a$ will raise the lower leaves of the plant, and prevent them from being broken off by the action of the clods of earth thrown over by the shovels of the plow. It will also be seen that the main arm $b$ serves to raise the leaves of the plant and prevent injury thereto by the passing of the plow, while the inclined arm $f$, being on a higher plane, wards off the plants from the plow and keeps the leaves raised while the shovels are throwing the earth around the stalks.

My improved fender is simple in construction, and can be applied to any tobacco plow or cultivator in the market. It has superior advantages for the purpose stated, inasmuch as the shoe serves to prepare the plant for cultivation by raising the lower leaves from off the ground, and the peculiar inclined arrangement and form of the fender in rear of the shoe serves to keep the higher leaves elevated and away from the plow, to prevent injury thereto until the action of the shovels has turned the clods of earth around the stalks. In this manner I am enabled to produce an article simple and efficient for the necessary purposes and manufactured at a price as to place it within the reach of all.

Having described my invention, I claim—

1. The combination, with a plow or cultivator, of the herein-described fender, comprising a series of bars connected together to form a frame, one side of which is attached to the standard of the plow or cultivator and the other side is inclined laterally downward, the frame also inclining downward toward the front in a longitudinal line, and a shoe or point provided at said front end, as set forth.

2. The combination, with a plow or cultivator, of the herein-described fender, comprising a frame, one side of which is attached to the standard of the plow or cultivator and the other side inclined laterally downward therefrom, the frame also inclining downward toward the front and in a longitudinal line, as set forth.

3. The herein-described fender, comprising a frame having the main longitudinal arm $b$ bent downward at its front end, and the inclined arm $f$ on a higher horizontal plane than the main arm, as and for the purpose set forth.

4. The herein-described fender, comprising the main longitudinal arm $b$, the inclined arm $f$ on a higher horizontal plane than the main arm, the short arm $h$, and the connecting transverse bar $g$, as set forth.

5. The herein-described fender, comprising the main longitudinal arm $b$, the inclined arm $f$ on a higher plane than the main arm, the short arm $h$, and the curved transverse bar $g$, the front end of the main arm being bent downward, as at $a$, and a clevis or equivalent means for attaching the short arm to one of the standards of the plow, as and for the purpose set forth.

In testimony that I claim the foregoing as my own I have hereto affixed my signature in presence of two witnesses.

ISAAC DAVIS.

Witnesses:
IRA I. DAVIS,
GEORGE HICKEY.